United States Patent
Peltz et al.

(10) Patent No.: US 7,590,107 B2
(45) Date of Patent: Sep. 15, 2009

(54) TCP/IP TRANSPORT INTERFACE FOR ISDN TELEPHONE

(76) Inventors: Marshall Peltz, 515 N. Spring Ave., LaGrange Park, IL (US) 60526; Anthony Dezonno, 233 Pinewood La., Bloomingdale, IL (US) 60108

( * ) Notice: Subject to any disclaimer, the term of this patent is extended or adjusted under 35 U.S.C. 154(b) by 941 days.

(21) Appl. No.: 10/984,103

(22) Filed: Nov. 9, 2004

(65) Prior Publication Data
US 2006/0098637 A1 May 11, 2006

(51) Int. Cl.
*H04M 3/00* (2006.01)
*H04B 7/212* (2006.01)
*H04L 12/66* (2006.01)

(52) U.S. Cl. .................. 370/356; 370/348; 370/444; 370/467; 379/265.09; 379/265.12; 379/265.14; 379/266.09

(58) Field of Classification Search ......... 370/352–357, 370/395.52, 348, 444, 467; 379/266.09, 379/265.09, 265.12, 265.14
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,061,347 A * | 5/2000 | Hollatz et al. | 370/352 |
| 6,067,357 A | 5/2000 | Kishinsky et al. | |
| 6,108,711 A | 8/2000 | Beck et al. | |
| 6,122,364 A * | 9/2000 | Petrunka et al. | 379/265.02 |
| 6,138,139 A | 10/2000 | Beck et al. | |
| 6,167,395 A | 12/2000 | Beck et al. | |
| 6,170,011 B1 | 1/2001 | Macleod Beck et al. | |

(Continued)

FOREIGN PATENT DOCUMENTS

EP 0 851 653 7/1998

(Continued)

*Primary Examiner*—Fan Tsang
*Assistant Examiner*—Lisa Hashem
(74) *Attorney, Agent, or Firm*—Husch Blackwell Sanders Welsh & Katz

(57) ABSTRACT

A method and apparatus are provided for operating a data protocol telephone that is used in a call for exchanging voice information between a first party human user of the data protocol telephone and a second human party to the call at least partially through the Internet. The method includes the steps of translating a set of control instructions exchanged over a first path between a controller of the data protocol telephone and the data protocol telephone, where said exchanged control instructions are translated between an Internet packet format readable by the controller and a set of repeating frame protocols readable by the data protocol telephone and transcoding the translated control instructions on the first Internet path and the voice information exchanged on a second Internet path, where the second Internet path is different than the first Internet path, said translated control instructions and exchanged voice information being transcoded between a single time division multiplexed repeating frame of the data protocol telephone and a packet format of the Internet.

31 Claims, 1 Drawing Sheet

U.S. PATENT DOCUMENTS

| | | |
|---|---|---|
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,188,762 B1 | 2/2001 | Shooster |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,732,156 B2 | 5/2004 | Miloslavsky |
| 6,934,279 B1* | 8/2005 | Sollee et al. ............. 370/352 |
| 7,257,217 B1* | 8/2007 | Lee .................. 379/265.01 |
| 7,382,773 B2* | 6/2008 | Schoeneberger et al. .... 370/353 |
| 2002/0032809 A1* | 3/2002 | Bateman et al. ............. 710/5 |
| 2002/0176403 A1 | 11/2002 | Radian |
| 2003/0008682 A1 | 1/2003 | Emerson, III |
| 2004/0131053 A1 | 7/2004 | Sjolund et al. |
| 2005/0238162 A1* | 10/2005 | Dezonno ............. 379/265.09 |
| 2006/0221941 A1* | 10/2006 | Kishinsky et al. .......... 370/352 |

FOREIGN PATENT DOCUMENTS

| | | |
|---|---|---|
| EP | 1333616 | 8/2003 |
| JP | 2002359650 | 12/2002 |
| WO | WO 03/005691 | 1/2003 |

* cited by examiner

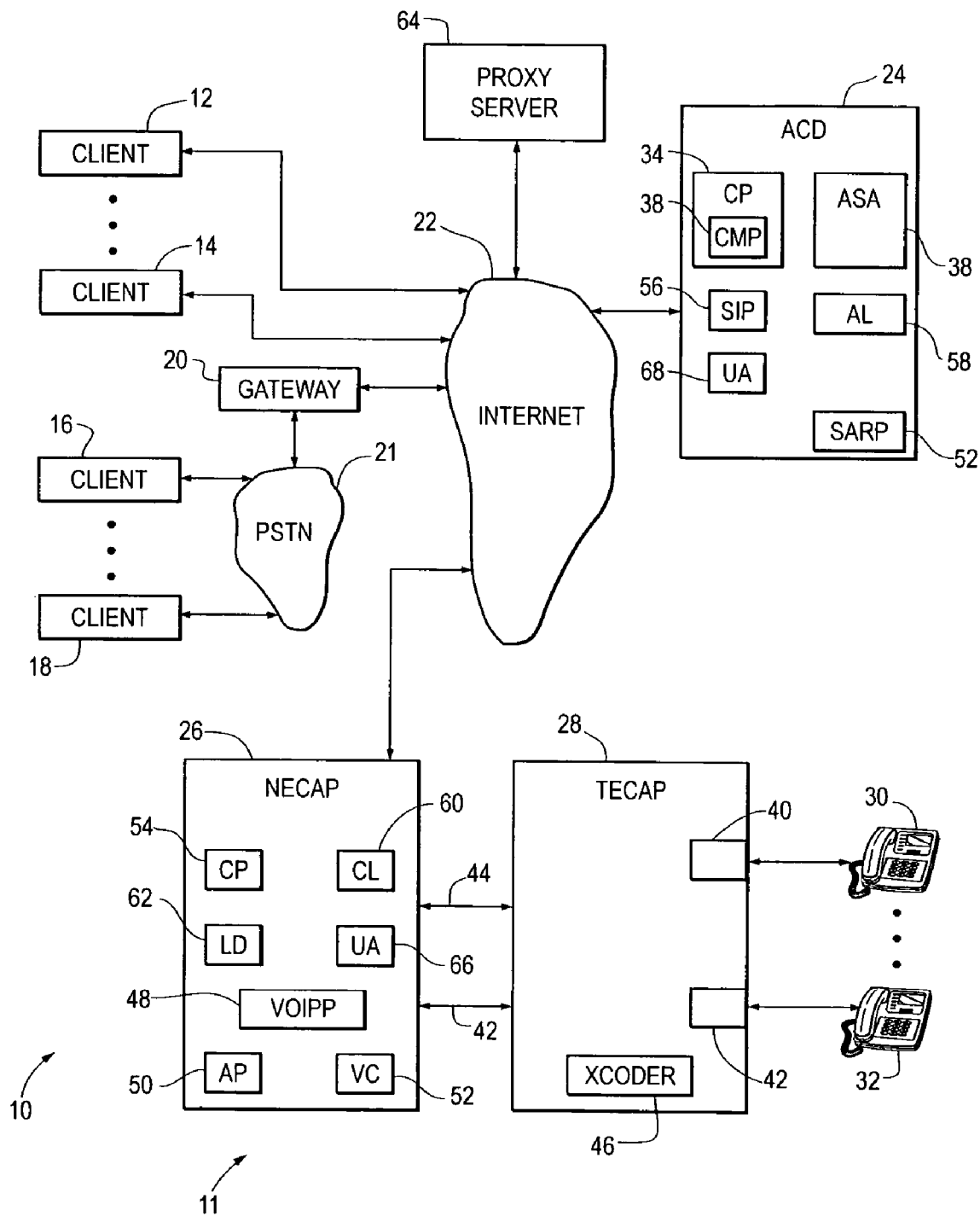

TCP/IP TRANSPORT INTERFACE FOR ISDN TELEPHONE

FIELD OF THE INVENTION

The field of the invention relates to communication systems and more particularly to automatic call distributors.

BACKGROUND OF THE INVENTION

Automatic call distributors (ACDs) are known. Such systems are typically used by organizations to serve large numbers of callers. Typically, calls are directed to a common telephone number and distributed to agents based upon some criteria (e.g., agent-idle time).

ACDs can typically process both inbound and outbound calls. Typically, a controller monitors a workload of its agents. Where a workload of received calls fall below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

In recent years, the functionality of ACDs has been expanded to also include processing voice calls through the Internet. Processing of voice calls through the Internet has results in a significant reduction in toll charges.

However, while the technology has advanced, there is still a significant inventory of older telephones available. Because of the significantly reduced costs of placing calls through the Internet, a need exists for a method of reducing the costs associated with the use of the older telephones.

SUMMARY

A method and apparatus are provided for operating a data protocol telephone that is used in a call for exchanging voice information between a first party human user of the data protocol telephone and a second human party to the call at least partially through the Internet. The method includes the steps of translating a set of control instructions exchanged over a first path between a controller of the data protocol telephone and the data protocol telephone, where said exchanged control instructions are translated between an Internet packet format readable by the controller and a set of repeating frame protocols readable by the data protocol telephone and transcoding the translated control instructions on the first Internet path and the voice information exchanged on a second Internet path, where the second Internet path is different than the first Internet path, said translated control instructions and exchanged voice information being transcoded between a single time division multiplexed repeating frame of the data protocol telephone and a packet format of the Internet.

BRIEF DESCRIPTION OF THE DRAWINGS

FIG. 1 is a block diagram of a data protocol telephone shown in a context of use under an illustrated embodiment of the invention.

DETAILED DESCRIPTION OF AN ILLUSTRATED EMBODIMENT

FIG. 1 is a block diagram of an automatic call distributor (ACD) 10 used by an organization to process calls with its clients and customers shown generally under an illustrated embodiment of the invention. Under illustrated embodiments, the ACD 10 may function as a controller to set up, distribute and control voice calls with clients and customers through the Internet 16 to one or more data protocol telephones 11, that together with its protocol conversion circuitry 26, 28 may include one or more integrated services digital network (ISDN) telephones 30, 32.

It is well-known to those of skill in the art, that ISDN telephones constitute a large portion of the installed telemarketing infrastructure today. The ability of the ACD 10 to distribute calls to ISDN telephones 30, 32 through the Internet significantly reduces the costs of upgrading the functionality of existing ACD equipment.

Turning first to the processing of calls, an explanation will be provided of the operation of the system 10, in general. Following the explanation of the system 10 in the context of processing calls, a description will be provided of the processing apparatus that allows ISDN telephones 30, 32 to be used with Internet calls.

In order to promulgate the agenda of the organization with its clients 12, 14, 16, 18, the organization may publish, by advertising or otherwise, one or more telephone numbers or universal resource locators (URLs) that identify communication paths to the organization. Clients 12, 14, 16, 18 may use these communication path identifiers to initiate contacts with the organization. Alternatively, the organization may purchase communication path identifiers of potential clients and place outgoing contacts directed towards the clients 12, 14, 16, 18.

In this regard, contacts with clients 16, 18 through the PSTN 21 may pass through a gateway 20 where voice information may be converted from the switched circuit format of the PSTN 21 to an Internet format using a voice-over-Internet-protocol (VoIP) application. Address resolution and call routing may be accomplished under Session Initiation Protocol (SIP) as described by the Internet Engineering Task Force (IETF) RFC #3261. Once converted by the VoIP application into an Internet format, contacts with clients 12, 14 (and clients 16, 18) may be processed by an automatic contact distributor 28.

In all cases, contacts set up through the Internet 22 may be delivered by the automatic contact distributor 24 to an agent working though a telephone 30, 32. In general, as each contact is detected (i.e., with a client 12, 14, 16, 18), a contact processor 34 may open a contact record and assign a unique identifier to the contact that may also be used as the record identifier. Within the record, the contact processor 34 may include any contact associated information that helps a comparison processor 36 within the contact processor 34 classify the call into one or more project types. In the case of calls through the PSTN 21, contact information, such as DNIS and ANI, may be able to identify the intended call destination and caller.

Where the organization uses different telephone numbers for different subject matter (e.g., the organization is a department store and the telephone numbers identify different departments), the DNIS information may be use (e.g., by itself) to determine a type of call involved. In addition, ANI may be used to identify the caller and to identify client records. The client records may be used to further clarify a subject matter and type of call.

Contacts with clients 12, 14 through the Internet may be classified in a similar manner to determine a type of call based upon other categories of contact associated information (e.g., a source universal resource locator or indicator (URL or URI), etc.). If the organization should provide a website, then any webpages visited by a client 12, 14 in advance of the contact may be further used to identify a subject matter and type of contact. As with contacts through the PSTN 21, the call processor 34 may open a file for contacts through the Internet, including any contact associated information.

Once a contact type is determined, the contact may be transferred to an agent selection application 38. The agent selection application 38 may function to identify an agent 30, 32 to handle the contact. Agent selection may be based upon any agent criteria (e.g., longest available, best skilled for the call type, etc.). Under one illustrated embodiment, the determined call type may be compared with a set of skills for each agent 30, 32 to identify an agent best qualified to handle the contact.

Once an agent is identified, the contact may be transferred to the selected agent 30, 32. The agent selection application 38 may transfer an Internet path identifier to the agent within a SIP INVITE along with instructions to activate the appropriate communication channel (e.g., VoIP, etc.) that, in turn, forms the communication channel.

Turning now to the data protocol telephones 11, an explanation will be provided as to how a data protocol telephone 11 interacts with the ACD 24 and clients 12, 14, 16, 18 through the internet 22. It should be noted first in this regard, that in general a data protocol telephone 11 may include a network equipment command analyzer processor (NECAP) 26, a terminal equipment command analyzer processor (TECAP) 28 and an ISDN telephone 30, 32. It should also be noted that each ISDN telephone 30, 32 has an associated basic rate interface (BRI) card 40, 42.

As is known, BRIs 40, 42 are normally connected to a primary rate interface that typically includes 23 B channels and 1 D channel. Accordingly, the NECAP 26 and TECAP 28 would normally be structured to process calls in increments of 23 channels.

In general, the NECAP 26 and TECAP 28 function to serve specific purposes in the process of interfacing the ISDN telephones 30, 32 with the Internet 22. For example, on a first level, the TECAP 28 may function as a transcoder to convert from the time division multiplexing of the BRIs 40, 42 to the packetized format of the Internet. As used herein, the term "transcode" or "transcoder" means the simultaneous encoding and decoding in both directions.

A transcoder 46 within the TECAP 28 may transcode the various information streams between the primary rate interface (that interacts with the BRIs 40, 42) and their respective ports 42, 44. For example, control information within the primary rate interface that is exchanged under a Q.931 format (as defined by ITU-T) may be exchanged with external devices through a first, control port (connection) 44 with the NECAP 26. Similarly, voice information exchanged under a G.711 format (as defined by ITU-T) may be exchanged with external devices through a second connection 42 with the NECAP 26.

Within the NECAP 26, the various information streams may be exchanged with one or more processing modules that function to set up and control calls between the Internet and telephones 30, 32. For example, voice information under a G.711 format may be exchanged between the port 42 and a VoIP processor 48 through a voice converter 52. In this case, the voice converter 52 may convert between a voice format used under the G.711 format and the format used within VoIP. The VoIP processor 48 may function to exchange VoIP voice information with clients 12, 14, 16, 18 through the Internet 22.

The set up of a connection between an ISDN telephone 30, 32 and client 12, 14, 16, 18 may include a number of intermediate steps. At a first, lowest level, the connection of a telephone 30, 32 into a BRI 40, 42 results in the assignment of an ISDN path identifier to the telephone 30, 32 and ultimately to the assignment of an Internet address to the telephone. The step of an agent signing-onto the system 10 results in an association between the agent identifier and the Internet address of the telephone 30, 32 used by the agent. The association of the Internet address with the agent allows the ACD 24 to assign calls to agents, as described in more detail below.

For example, an agent working through a ISDN telephone 30, 32 may plug in the telephone 30, 32 at the beginning of his/her shift. Plugging in the telephone 30, 32 causes the telephone 30, 32 to transmit a terminal endpoint identifier (TEI) request through the first connection 44 under a Q.931 format to an address resolution processor 50.

The address resolution processor 50 may use an Internet address resolution protocol (i.e., IPv4) to map IP network addresses to the hardware addresses used by a data link protocol. The NECAP 26 may be provided with a predetermined network address upon startup or may be given the same network address as the ACD 24.

In effect, the address resolution processor 50 assigns an Internet address to each telephone 30, 32 when they are plugged in, based upon their TEI. Upon determining an Internet address for a telephone 30, 32, the address resolution processor 50 may save the Internet address and an identifier of a connection path in a connection list 60.

Once an agent goes off-hook with a telephone 30, 32, the agent may enter a personal identifier. As the agent goes off-hook, the BRI 40, 42 detects the off-hook condition and prepares itself to accept and collect dialed digits. The collected digits may be forwarded over the control connection 44 to a control processor 54.

The control processor 54, by reference to the address resolution processor 50, may determine an Internet address of the telephone 30, 32 providing the digits and then compose a packet that includes the collected identification digits and Internet address of the telephone 30, 32. The control processor 54 may forward the packet over a first Internet path to a sign-on processor 56 within the ACD 24. The sign-on processor 56 may compare the identifier digits to an agent list 58 to identify the agent. Once the agent is identified, the sign-on processor 56 may enter the Internet address of the telephone 30, 32 into the list 58 adjacent the agent identifier.

Once the Internet address of the agent's telephone 30, 32 is known to the ACD 24, the ACD 24 may begin assigning calls to the agent 30, 32. To assign a call, the ACD 24 may transfer an Internet address of the client 12, 14, 16, 18 and agent 30, 32 to the NECAP 26 within a SIP INVITE. Within the NECAP 26, the call assignment is transferred to the control processor 54 where the path to the agent 30, 32 is recovered from the connection list 60. The control processor 54 may then transfer the Internet address of the client 12, 14, 16, 18 and path to the agent 30, 32 to the VoIP processor 48. The VoIP processor 48 may, in turn, format a separate VoIP application that acknowledges and accepts the SIP INVITE thereby forming the final VoIP end-to-end connection between the client 12, 14, 16, 18 and selected agent 30, 32.

In addition to forming the connection between client 12, 14, 16, 18 and agent 30, 32, the NECAP 26 may also provide the pushbutton functionality associated with the telephones 30, 32. For example, the control processor 54 may also illuminate a line button on the agent's telephone 30, 32 associated with the line on which the agent signed-on to the ACD 24.

Alternatively, control of indicating lights on the telephone 30, 32 may be provided by the control processor 54 forwarding notice and the identity of each pushbutton activated on the telephone 30, 32 to the ACD 24. Corresponding device drivers located within the ACD 24 may provide activation of appropriate signaling lights on the telephone 30, 32.

If the agent should activate a HOLD button, then the control processor 54 may detect the activation through the control connection 44 and activate a HOLD button light via a device driver 62. The control processor 54 may also instruct the VoIP processor 48 to suspend voice traffic between the respective VoIP application and the active line of the agent's telephone 30, 32.

If the agent 30, 32 should activate the formerly inactive line key, then the control processor 54 may detect the activation of the key and subsequently activate a light on the key. The control processor 54 may also prepare itself to accept a dialed telephone number entered through a keypad of the telephone 30, 32.

Upon detecting the entered telephone number, the control processor 54 may transfer the dialed number to a user agent 66, 68 (as defined by IETF RFC #3261) within the TECAP 26 or ACD 24. The user agent 66, 68, by reference to a proxy server 64 (also as defined by IETF RFC #3261) may identify an Internet address associated with the entered telephone number.

Upon identifying an Internet address associated with the enter telephone number, the user agent 66, 68 may compose a SIP INVITE to the identified Internet address proposing a VoIP connection. If the target accepts, then the user agent 66, 68 may set up an audible connection and the agent and called party may begin conversing.

A specific embodiment of method and apparatus for operating a data protocol telephone has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of operating a data protocol telephone that is used in a call for exchanging voice information between a first party human user of an Integrated Services Digital Network (ISDN) protocol telephone of an automatic contact distributor (ACD) and a second human party to the call, the ACD coupled to the ISDN protocol telephone through a controller of the data protocol telephone and at least partially through the Internet, such method comprising:
    translating a set of control instructions exchanged over a first path between the controller of the data protocol telephone and the ISDN protocol telephone, where said exchanged control instructions are translated between an Internet packet format readable by the controller and a set of time division multiplex repeating frame protocols readable by the ISDN protocol telephone; and
    transcoding the translated control instructions on the first path and voice information exchanged on a second path, where the second path is different than the first path, said translated control instructions and exchanged voice information being transcoded between a single time division multiplexed repeating frame of the ISDN protocol telephone and a packet format of the Internet.

2. The method of controlling calls as in claim 1 further comprising defining the controller as coupled to the automatic contact distributor, the first party human user as one of a plurality of agents of the automatic contact distributor, and the second party human user as one of a plurality of clients of an organization operating the automatic contact distributor.

3. The method of controlling calls as in claim 2 further comprising distributing the call to the agent from the automatic contact distributor via the Internet, and wherein the controller communicates via the Internet using a VOIP protocol, and with the ISDN telephone using a basic rate interface.

4. The method of controlling calls as in claim 2 further comprising assigning a first Internet address to the one agent for exchanging control instructions with the automatic contact distributor.

5. The method of controlling calls as in claim 4 further comprising resolving an address of the one agent in response to a terminal endpoint identifier generated by the one agent plugging in the one agent's integrated services digital network telephone.

6. The method of controlling calls as in claim 2 further comprising the automatic contact distributor assigning the contact with the client to the one agent and transferring an Internet address of the client to the controller.

7. The method of controlling calls as in claim 6 wherein the step of assigning the contact with the client to the one agent further comprises sending a SIP INVITE to the one agent where the SIP INVITE contains an Internet address of the client.

8. The method of controlling calls as in claim 7 further comprising sending an alerting message to the one agent as one of the exchanged control instructions to notify the agent of the arrival of the contact.

9. The method of controlling calls as in claim 8 further comprising activating a line indicator light on the telephone of the one agent when the agent accepts the contact with the client.

10. The method of controlling calls as in claim 2 further comprising detecting activation of a HOLD button on the telephone of the one agent and placing the contact between the client and the one agent on HOLD.

11. The method of controlling calls as in claim 2 further comprising collecting digits of a new contact entered through a keypad on the telephone of the one agent and composing a SIP INVITE for delivery to a target of the new contact.

12. A data protocol telephone that is used in a call for exchanging voice information between a first party human user of an Integrated Services Digital Network (ISDN) protocol telephone and a second human party to the call at least partially through the Internet, such method comprising:
    means for translating a set of control instructions exchanged over a basic rate interface path between a controller of the data protocol telephone and the ISDN protocol telephone, where said exchanged control instructions are translated between an Internet packet format readable by the controller and a set of time division multiplex repeating frame protocols readable by the ISDN protocol telephone; and means for transcoding the translated control instructions on a first path and voice information exchanged on a second path, where the second path is different than the first path, said translated control instructions and exchanged voice information being transcoded between a single time division multiplexed repeating frame of the SDN protocol telephone and a packet format of the Internet.

13. The data protocol telephone as in claim 12 further comprising defining the controller as coupled to an automatic contact distributor, the first party human user as one of a plurality of agents of the automatic contact distributor, and the second party human user as one of a plurality of clients of an organization operating the automatic contact distributor.

14. The method data protocol telephone as in claim 13 further comprising means for distributing the call to the agent from the automatic contact distributor via the Internet, and wherein the controller communicates via the Internet using a VOIP protocol, and with the ISDN telephone using the basic rate interface.

15. The method data protocol telephone as in claim 13 further comprising means for assigning a first Internet address to the one agent for exchanging control instructions with the automatic contact distributor.

16. The data protocol telephone as in claim 15 further comprising means for resolving an address of the one agent in response to a terminal endpoint identifier generated by the one agent plugging in the one agent's integrated services digital network telephone.

17. The method data protocol telephone as in claim 13 further comprising means within the automatic contact distributor for assigning the contact with the client to the one agent, and for transferring internal addresses of the client to the controller.

18. The data protocol telephone as in claim 17 wherein the means for assigning the contact with the client to the one agent further comprises means for sending a SIP INVITE to the one agent where the SIP INVITE contains an Internet address of the client.

19. The data protocol telephone as in claim 18 further comprising means for sending an alerting message to the one agent as one of the exchanged control instructions to notify the agent of the arrival of the contact.

20. The data protocol telephone as in claim 19 further comprising means for activating a line indicator light on the telephone of the one agent when the agent accepts the contact with the client.

21. The method data protocol telephone as in claim 13 further comprising means for detecting activation of a HOLD button on the telephone of the one agent and placing the contact between the client and the one agent on HOLD.

22. The data protocol telephone as in claim 13 further comprising means for collecting digits of a new contact entered through a keypad on the telephone of the one agent and composing a SIP INVITE for delivery to a target of the new contact.

23. A data protocol telephone that is used in a call for exchanging voice information between a first party human user of an Integrated Services Digital Network (ISDN) protocol telephone and a second human party to the call at least partially through the Internet, such method comprising:

a control processor that translates a set of control instructions exchanged over a communications path between a controller of the data protocol telephone and the ISDN protocol telephone, where said exchanged control instructions are translated between an Internet packet format readable by the controller and a set of time division multiplex repeating frame protocols readable by the data protocol telephone; and a transcoder that transcodes the translated control instructions on a first path and voice information exchanged on a second path, where the second path is different than the first path, said translated control instructions and exchanged voice information being transcoded between a single time division multiplexed repeating frame of the ISDN protocol telephone and a packet format of the Internet.

24. The data protocol telephone as in claim 23 further comprising defining the controller as coupled to an automatic contact distributor, the first party human user as one of a plurality of agents of the automatic contact distributor and the second party human user as one of a plurality of clients of an organization operating the automatic contact distributor.

25. The method data protocol telephone as in claim 24 further comprising an agent selection application that distributes the call to the agent from the automatic contact distributor via the Internet and wherein the controller communicates via the Internet using VOIP, and with the ISDN telephone using a basic rate interface.

26. The method data protocol telephone as in claim 24 further comprising an address resolution processor that assigns a first Internet address to the one agent for exchanging control instructions with the automatic contact distributor.

27. A method of controlling calls between a plurality of remotely located agents of an organization and a plurality of clients of the organization connected to the organization through the Internet, where at least some agents of the plurality of remotely located agents use integrated services digital network telephones, such method comprising the steps of:

providing an automatic contact distributor for distributing calls with the plurality of clients to the plurality of agents;

exchanging control instructions between the automatic contact distributor and an integrated services digital network (ISDN) telephone of one of the plurality of remotely located agents using an Internet path;

exchanging voice information during a contact between the ISDN telephone of the one agent and a client of the plurality of clients over a second Internet path;

translating the exchanged control instructions on the first Internet path between a SIP protocol of the automatic contact distributor and a set of Q.931 and G.711 protocols of the ISDN telephone of the one agent; and transcoding the exchanged voice information and translated control instructions between a time division multiplexed format of the ISDN telephone of the one agent and a packet format of the Internet.

28. The method of controlling calls as in claim 27 further comprising assigning a first Internet address to the one remotely located agent for exchanging control instructions with the automatic contact distributor.

29. The method of controlling calls as in claim 27 further comprising resolving an address of the one agent in response to a terminal endpoint identifier generated by the one agent plugging in the one agent's integrated services digital network telephone.

30. The method of controlling calls as in claim 27 further comprising sending an alerting message to the one remotely located agent to notify the agent of the arrival of the contact.

31. The method of controlling calls as in claim 27 further comprising translating the exchanged voice information between a voice-over-Internet-format of the client and a pulse coded modulation format of the one remotely located agent.

* * * * *